Jan. 3, 1956      R. G. OLSON      2,729,242

CONTROL VALVE

Filed April 14, 1953      2 Sheets-Sheet 1

INVENTOR.
Raymond G. Olson
BY Kenneth D. Snow
Atty.

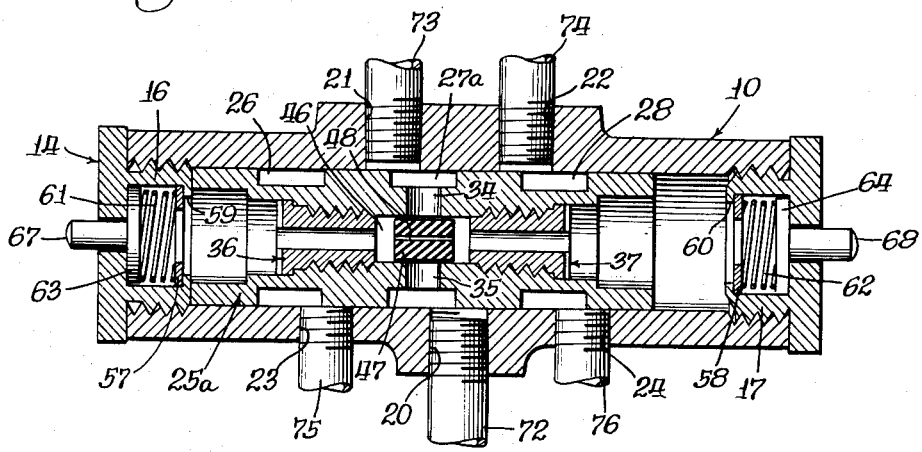

United States Patent Office 2,729,242
Patented Jan. 3, 1956

2,729,242
CONTROL VALVE
Raymond G. Olson, Niles, Ill., assignor of one-half to Kenneth T. Snow, Oak Park, Ill.
Application April 14, 1953, Serial No. 348,775
6 Claims. (Cl. 137—622)

This invention relates to a new and improved control valve.

The control of fluid operated equipment has long been a major problem for industry. The operation of machines or parts thereof by fluid under pressure whether it be gas or liquid is becoming more and more prevalent. Usually cylinders with pistons therefor are employed to directly perform some mechanical function. Thus the positive control of piston extension or retraction is extremely important to commercial success.

It is therefore a principal object of this invention to provide a control valve for fluid operated equipment.

An important object of this invention is the provision of a control valve for fluid operated equipment wherein in response to incoming fluid under pressure the control valve is assisted in its shifting movement.

Another and further important object of this invention is the provision of a control valve wherein fluid under pressure may be alternately moved in either of two directions.

Another and still further important object of this invention is to supply a control valve for fluid operated equipment which can create a status quo of all fluid under pressure in the system at any time or may direct fluid in either of two directions.

Still another important object of this invention is to provide a control valve for fluid operated equipment wherein the valve will automatically center after each operation thereof.

A still further modified form of control valve may be actuated to operate one way or the opposite way to direct fluid under pressure in either direction and the control valve will move through the full distance thereof and remain in its end position.

A further object of this invention lies in the actuation of a control valve by the manual bleeding or discharging of all fluid from one end or the other whereafter incoming fluid under pressure will cause a shifting of the control valve.

Another important object of this invention resides in the means for entrapping fluid bled from a control valve.

Other and further important objects and advantages will become apparent from the disclosures in the following specification and accompanying drawings.

In the drawings:

Figure 3 is a longitudinal sectional view of a modified form of valve incorporating all of the principles of the valve of Figures 1 and 2 except for the self centering thereof.

Figure 4 is a still further modified form of control valve using a fluid entrapping means at the points of bleeding at both ends of the control valve.

As shown in the drawings:

Figure 1:
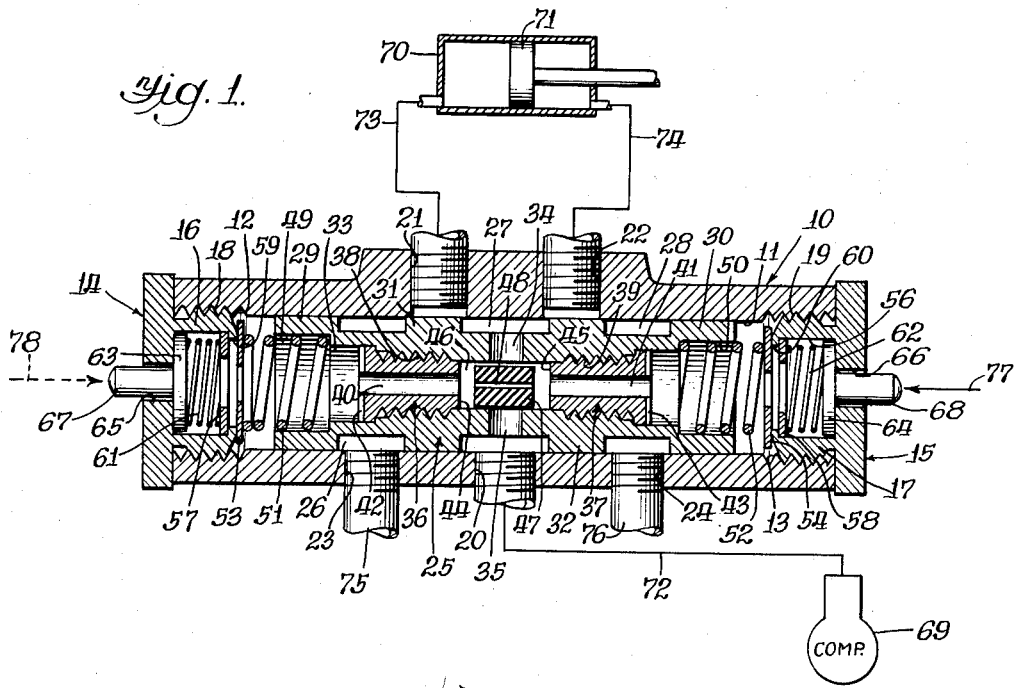
Figure 1 is a longitudinal sectional view of the control valve of this invention and including various associated elements in diagrammatic illustration.

The reference numeral 10 indicates generally a housing or body for the control valve of this invention. The housing 10 is preferably a casting and is equipped with a longitudinally extending and generally centrally disposed bore or passage 11. The ends of the passage 11 are threaded internally as shown at 12 and 13. End plugs 14 and 15 having reduced diameter shoulders 16 and 17 which are externally threaded at 18 and 19 engage the internally threaded passage ends 12 and 13 of the housing.

The housing 10 has an inlet port or passage 20 to receive fluid under pressure. The function of the control valve of this invention is to receive fluid under pressure and then direct it to the fluid operated equipment in the desired manner. The housing 10 also includes spaced apart outlet ports or passages 21 and 22 through which the fluid under pressure is delivered. Exhaust ports 23 and 24 are provided in the housing 10 through which the fluid being discharged from the fluid operated equipment is delivered.

An elongated cylinder, spool or barrel valve 25 is adapted to slide within the bore 11 of the housing 10. The spool valve is provided with longitudinally spaced apart annular grooves or recesses 26, 27, and 28. End lands 29 and 30 on the slide valve 25 lie adjacent the outer grooves 26 and 28. Spaced apart intermediate annular lands 31 and 32 flank the central annular groove 27 and lie within the grooves 26 and 28. The spool is further identified with a longitudinally extending passage 33 disposed substantially centrally thereof. Radial passages 34 and 35 in the valve 25 join the centrally disposed annular groove 27 with the longitudinally extending passage 33 within the valve.

Internally of the spool valve there is provided externally threaded sleeves or bushings 36 and 37 which threadedly engage spaced apart internally threaded portions 38 and 39 of the passage 33. The bushings 36 and 37 are themselves provided with longitudinally extending generally centrally located, aligned passages 40 and 41 of equal diameter through which fluid is permitted to pass from the center of the spool valve adjacent the radial passages to the ends of the spool valve 25. Each bushing 36 and 37 is equipped with a screwdriver slot 42 and 43 respectively in the outer ends thereof for the purpose of assembly or removal within the spool 25. The inner ends 44 and 45 of the bushings 36 and 37 constitute spaced apart valve seats and further define a chamber 46 therebetween. A small center valve member 47 is positioned within the chamber 46 and is adapted to engage either of the valve seats 44 or 45 to thus substantially close off or restrict passage of fluid to either end of the spool valve. The valve 47 is provided with a longitudinally extending small diametered bleed hole 48 therethrough. The bleed hole 48 is substantially centrally disposed and serves to prevent the complete close off of fluid to one side or the other. It is the effective differential in the diameters of the passages 40 and 41 with respect to the valve passage 48 that makes this device effectively operate as will later be described.

The passage 33 through the spool valve has enlarged end openings 49 and 50 disposed outwardly of the threaded bushings 36 and 37. These openings or chambers 49 and 50 are adapted to receive the inner ends of helically wound coil springs 51 and 52. The springs 51 and 52 extend outwardly in opposite directions and abut against washers 53 and 54 respectively. The washers lie against the inner ends of the threaded shoulders 16 and 17 and it will thus be seen that the springs 51 and 52 are confined within the valve housing. The springs are of equal strength in order to cause a normal automatic centering of the spool valve within the longitudinal bore of the housing 10.

The end plugs 14 and 15 are equipped with hollowed chambers 55 and 56 within the shoulders 16 and 17. Retaining washers 57 and 58 are positioned at the inner ends of the chambers 55 and 56 and are securely held by inturned lips 59 and 60 formed from the shoulder peripheries. Springs 61 and 62 are disposed within the chambers 55 and 56 and at their one ends abut the fixed washers 57 and 58. End fluid bleeding valves 63 and 64 are positioned within the chambers 55 and 56 respectively and are arranged and constructed to close centrally located opennigs 65 and 66 in the end plugs 14 and 15. Post members or valve stems are integrally mounted on the end valves and project through the openings 65 and 66 respectively. The springs 61 and 62 normally urge the valves 63 and 64 to closed positions with the end plugs 14 and 15 and thus maintain the holes 65 and 66 closed to the passage of fluid. A manual depression of either valve operating stem 67 or 68 causes the respective valve to move inwardly against the action of the holing spring 61 or 62 and at that time permit the passage of fluid from within the valve housing 10.

The control valve of this invention is used as previously stated with hydraulic or fluid equipment and thus in order to show the environment thereof the other necessary elements have been shown in a rather diagrammatic fashion to complete a fluid circuit or system. A compressor or fluid pump is shown diagrammatically at 69. This compressor is arranged and constructed to deliver fluid under pressure to the control valve whereafter it is directed in the manner as determined by the control valve. A fluid operated cylinder 70 having a piston 71 slidable therein is representative of the device which is to be operated by the control valve. The reference numeral 72 is a diagrammatic illustration of a conduit joining the compressor to the inlet port 20 of the valve. Similarly the reference numeral 73 represents the joining of the valve outlet port 21 to one end of the fluid cylinder 70. The other conduit is shown at 74 and joins the spaced apart outlet port 22 to the other end of the fluid cylinder 70. Thus fluid under pressure may be delivered to either end of the cylinder 70 to effect a movement of the piston 71 in either direction depending upon the position of the spool within the control valve housing. An exhaust conduit is illustrated at 75 for joining the exhaust port 23 to a fluid reservoir (not shown). The other exhaust port 24 is joined by a conduit 76 also leading to the same fluid reservoir whereby the fluid circuit is completed. The reservoir, of course, delivers fluid to the compressor for recirculation as called for by the apparatus.

In the operation of the device the compressor or pump 69 continually delivers fluid under pressure to the control valve whereupon it passes through the inlet port 20 around the annular groove 27 and thence passing outwardly through restricted passages to the outlet ports 21 and 22 inasmuch as both ports are slightly "cracked" to the groove 27. In this position as shown in Figure 1 the spool valve 25 is centered within the housing 10 and it should be understood when the valve is so centered the position of the piston 71 in the cylinder to be controlled remains stationary. The balanced springs and the balanced fluid pressure in each end of the valve insures this static central position. In order to effect movement of the spool valve and a change in the direction of flow of fluid one end valve 63 or 64 is necessarily opened to permit escape of fluid within the central passage of the spool 25. As shown in Figure 1 the stem 68 is depressed as indicated by the arrow 77 whereupon the valve 64 leaves its seat around the opening 66 in the end plug enabling fluid to pass outwardly therefrom. The inside of the spool valve is usually filled with fluid by reason of the entry of the fluid from the inlet through the radial passages 34 and 35 into the chamber 46 between the bushings 36 and 37.

The opening of the end valve 64 permits the escape of the internal fluid at that end of the control valve with the result that the central valve 47 is drawn or "sucked" into engagement with the valve seat 45 on the bushing 37 adjacent the end of the control valve having the end valve opened. The movement of the small internal valve 47 is occasioned by two happenings. One, of course, is the exhaustion of fluid from the seat and a natural tendency of the valve to move along with the fluid to a seated position. The second occurs by the building up of fluid pressures in the opposite end of the spool valve to an extent where the unbalancing of fluid pressures causes the valve 47 to be forced to a seated position. Simultaneously with the substantial closing of the fluid passage within the spool valve the whole spool is forced to move longitudinally within the housing toward the opened end valve. The spool valve movement is occasioned by substantially all of the same reasons as the closing of the small central valve 47 but principally by reason of the unbalanced condition of fluid within the housing which overcomes the forces of the balanced springs 51 and 52. It is material to the successful operation of this device that the central passage within the spool valve be not completely closed. The shifting of the valve 47 to either one side or the other causes a differential in the size of the central passage 40—41 to either one end or the other whereupon the spool or slide valve will have rapid movement to one end or the other of the housing. Immediately after shifting of the spool valve in one direction incoming fluid under pressure in the path indicated by the arrow 79 is barred from entering one of the outlet ports 21 or 22 and is permitted greater and greater entry into the other one of them. Continuing with the example wherein the end valve 64 has been opened, the spool valve moves toward that valve causing a closing of the outlet port 21 and a full opening of the port 22. This directs delivery of fluid under pressure in the direction of the arrow 80 through the conduit 74 to one end of the fluid operated cylinder 70 wherein the piston 71 is caused to recede within the cylinder. Of course the fluid in the cylinder 70 behind the piston must be discharged and this is accomplished through the conduit 73 in the direction of the arrow 81 to the outlet port 21 and thence around the annular groove 26 to the exhaust port 23. This port 23 as previously stated returns the fluid through the conduit 75 in the direction of the arrow 82 to a reservoir where it may be used for recirculation. The control valve thus performed the function of controlling movement of the fluid equipment. However, the operation of the control valve is not completed. If the end valve 64 is released from its state of manual depression the spool valve will immediately seek a balance within the housing. This balance seeking occurs by the fluid under pressure bleeding through the hole 48 in the central valve 47 to the chamber within the spool valve just recently exhausted of its fluid. Soon this fluid builds up sufficiently so that added to the effective strength of the compressed spring 52 the spool valve tends to center within the housing. Similarly when the fluid within the one end of the valve balances the fluid within the other end the valve 47 relaxes its seating position and tends to float centrally within the chamber 46 between the spaced apart valve seats 44 and 45. Although the workings of this control valve have taken considerable time and words to explain, in actual operation they function quite rapidly. The opening of an end valve results in instantaneous movement of the piston 71 in the fluid operated cylinder 70. And, similarly the closing of the end valve halts further movement of the piston 71.

Figure 2:
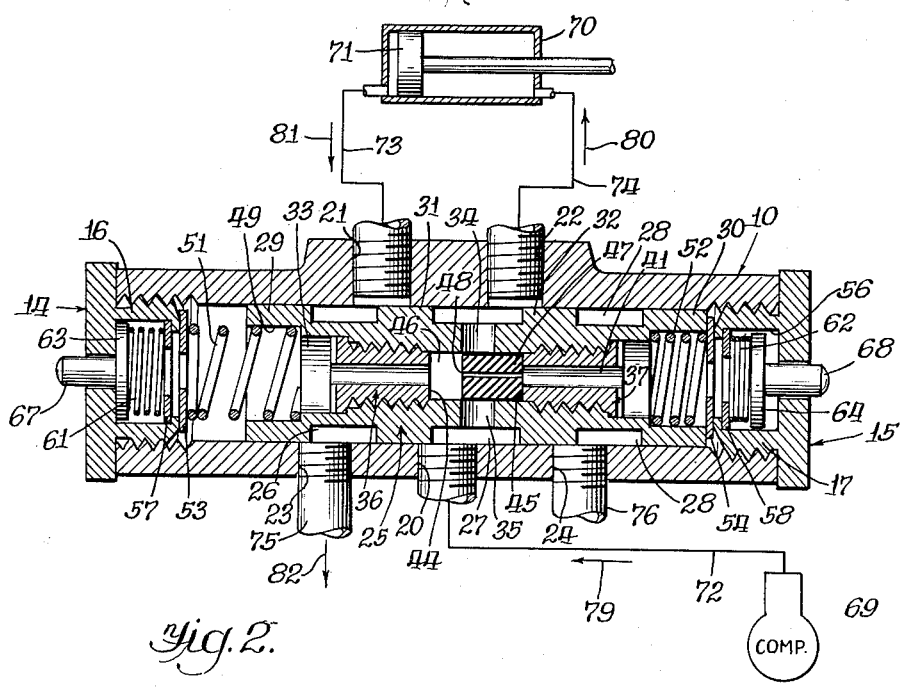
Figure 2 is a view similar to Figure 1 wherein the valve is shown in shifted position for effecting a directing of fluid under pressure to one end of the fluid cylinder to be operated.

The operation of the device resulting from the depression of the end valve 64 has been rhetorically described and is shown pictorially in Figures 1 and 2 of the drawings. Let us now assume that the end valve 63 is depressed as indicated by the arrow 78. The results will be opposite in direction, but in principle will be the same. Fluid is exhausted from that end of the spool valve adjacent the end valve 63 whereupon two things occur, namely, the central valve 47 closes against the bushing seat 44 and the spool valve moves longitudinally within the bore 11 of the housing against the action of the spring 51. Fluid under pressure from the pump 69 is now directed to the end of the cylinder 70 wherein the piston is forced into extended position. The fluid within the cylinder 70 on the other side of the piston 71 is exhausted through the control valve to the reservoir. Thus it will be evident that the control valve may effect movement of fluid operated equipment in either direction.

The device of Figure 3 is a slight modification from the valve as shown in Figures 1 and 2. The only material change is the omission of the springs 51 and 52 which makes the control valve non-centering and non-stoppable intermediate the ends of the stroke. The same reference numerals have been used on all of the parts in Figure 3 which are identical to those shown in Figures 1 and 2. The slide or spool valve of Figure 3 designated by the numeral 25a remains in one end of the housing or the other such as shown.

In the operation of this modified construction fluid under pressure is delivered to the inlet port 20 whereupon it passes around an annular groove 27a and thence out the outlet port 21 to effect operation of some fluid equipment. The annular recess 27a is similar to the annular recess 27 but slightly narrower as there is no necessity of spanning the spaced outlet ports because the spool is never retained in a centered position. However, it would not be detrimental to employ the spool 25 with the wide recess 27 in the device of Figure 3. The fluid exhausted from the fluid equipment (not shown) is returned through the other spaced apart outlet port 22 and around the annular groove 28 for final discharge back to a reservoir or the like through the exhaust port 24. Simultaneously with the delivery of fluid to the port 21 a quantity thereof passes inwardly through the radial passages 34 and 35 to fill the interior of the spool valve as in the device of Figures 1 and 2. Inasmuch as there are no springs urging movement of the spool valve they are therefore moved solely by differentials in fluid pressure. When the end valve 64 is opened by depressing the actuating post or stem 68 fluid within the spool valve and within the housing 10 rushes out the end opening whereupon the center valve 47 closes against the valve seat 45 with the result that fluid in the non-opened end of the valve pushes the spool 25 to the other end of the housing. This causes a reversal of the direction of flow of fluid through the control valve and thus the fluid under pressure delivered to the equipment to be operated is reversed. If nothing more is done the spool valve will then remain in the bore 11 of the housing 10 in the opposite end thereof. When the equilibrium of the fluid within the valve is broken the spool valve moves to the other end and stays there until the balance of fluids is again upset by the opening of the opposite end valve. Thus, when the end valve 63 is opened the spool valve will then return to the position in which it is shown in Figure 3. It is apparent that the control valve of Figure 3 performs many valuable functions in the operation of fluid actuated equipment. It is similar to the valve of Figures 1 and 2, but yet the removal of the springs brings it into a different category as there is no intermediate stopping and the spool valve is either in one end position or the other end position. This means that fluid under pressure is constantly being delivered to one end of the fluid operated equipment or the other at all times.

The modification shown in Figure 4 is applicable to the control valve of either Figures 1 and 3 and for convenience only has been shown with the valve of Figure 3. The purpose of the device of Figure 4 is to recover fluid exhausted or bled through the end valves in the actuation of the control valve. In other words it comprises a sealing means and suitable passageways for returning the discharged fluid back to a reservoir or the like.

In the same manner for the devices of Figures 1 and 3 similar reference numerals have been applied to like parts on the modified valve of Figure 4. The reference numeral 83 indicates an elongated housing corresponding to the housing 10, but for added length thereto necessary to include the fluid recovery means at the ends thereof. End plugs are shown at 84 and 85 to provide closure means at the opposed ends of the housing 83. The end plugs have elongated reduced diameter shoulders 86 and 87 which are externally threaded at 88 and 89 for the purpose of removable engagement with the internally threaded ends of the housing 83. Chambers 90 and 91 are provided within the end plug shoulders 86 and 87 and are comparable in size to the chambers 55 and 56 in the end plugs of the devices of Figures 1 and 3. Auxiliary chambers 92 and 93 are also formed in the end plugs in side by side relationship with the chambers 90 and 91 respectively. Intermediate the adjoining chambers 90 and 92, and 91 and 93 there are provided annular offsets or shoulders 94 and 95 respectively. Valves 96 and 97 are adapted to engage the offsets 94 and 95 and it should be apparent that the offsets or shoulders comprise the valve seats. Springs 98 and 99 are confined within the chambers 90 and 91 respectively in a manner similar to the springs 61 and 62 within the chambers 55 and 56. The springs 98 and 99 are held within the chambers 90 and 91 by means of retaining washers 100 and 101 which are themselves held in position by a peening over of the ends of the shoulders 86 and 87 as shown at 102 and 103. Valve stems 104 and 105 are integrally fastened to the valves 96 and 97 and extend laterally outwardly through the end plugs for manual depressing operation in the same manner as the valve stems or posts of the devices of Figures 1 and 3. Apertured partition walls 106 and 107 lie adjacent to, and constitute the outer walls for the auxiliary chambers 92 and 93 and permit the slidable passage of the valve stems 104 and 105 therethrough.

The end plugs 84 and 85 are provided with end openings 108 and 109 which are internally threaded as shown at 110 and 111. Rubber O rings 112 and 113 surround the valve stems 104 and 105 within the openings 108 and 109. The fluid sealing O rings are maintained in abutting partially compressed condition against the apertured partition walls 106 and 107 because of their engagement by externally threaded apertured bushings 114 and 115 which threadedly engage the end openings 108 and 109. The rubber O rings are thus confined between the apertured walls and the bushings whereby they exert radial sealing pressure against the valve stems. Upon axial movement of the stems the rubber O rings rotate within their confined quarters but at all times remain in fluid sealing relationship with the stems.

Radial passages 116 and 117 are provided in the control valve housing 83 adjacent the ends thereof. Aligned radial passages 118 and 119 are provided in the elongated shoulders 86 and 87 and communicate with the auxiliary chambers 92 and 93 within the end plugs. Conduits 120 and 121 respectively join the radial passages 116 and 117 with the fluid reservoir (not shown) whereby fluid exhausted or bled through the end valves 96 and 97 may be retained within the closed fluid system.

In certain applications of the control valves of this invention it is not necessary to recover fluid exhausted from the ends thereof in order to actuate the valves. However, in other installations it is essential that the device be fluid tight and in that event the auxiliary fluid recovery means of Figure 4 is necessary. In the operation of that device the control valve is again actuated by a depression of either of the valve stems 104 and 105 whereby fluid within the valve is permitted to escape past one of the valves 96 or 97 to the auxiliary chambers 92 and 93. Further axial or endwise movement of the fluid is barred by the sealing O rings 112 and 113. However, the fluid is permitted to escape back to a reservoir through the aligned radial passages 116 and 118, and 117 and 119 which join the auxiliary chambers 92 and 93 with the conduits 120 and 121. Obviously the valve in every other respect operates as the valve of Figure 3. The only difference is to prevent leakage of fluid at the control valve at the time of operating thereof.

It is believed important to note that all of the control valves of this invention are fully operable regardless of the angular disposition thereof. The valves thus need not be horizontally disposed, but may be vertically disposed or inclined at any convenient angle without in any way interfering with proper operation thereof.

Numerous details of construction may be varied throughout a wide range without departing from the principles disclosed herein, and I therefore do not propose limiting the patent granted hereon otherwise than as necessitated by the appended claims.

What is claimed is:

1. A control valve for fluids comprising a housing having a cylindrical bore therethrough, a cylindrically shaped valve slidably engaging said housing bore, said cylindrically shaped valve having an annular groove therearound spaced substantially centrally between the ends thereof, and a spaced apart annular groove on each side of said centrally located annular groove, said cylindrically shaped valve having a longitudinally disposed substantially centrally located bore extending the length thereof, said valve having passage means joining said centrally located annular groove and said longitudinally extending bore, a valve disposed within said longitudinally extending bore, spaced apart valve seats within said longitudinally extending bore and disposed on each side of a central section thereof including said passage means, said valve slidable in the central section of said bore between said valve seats, said valve having bleed means therein, whereby when said valve is positioned on one valve seat that seat is closed except for leakage past the seat to the central section of said bore through said bleed means and simultaneously the other of said valve seats is completely open, individual bleed valves on each end of said housing and constituting a closure for the ends of said cylindrical bore, said housing having an inlet passage adjacent a central portion thereof and adapted to communicate with the centrally located annular groove, and outlet passages spaced from the inlet passage.

2. A device as set forth in claim 1 in which similar spring means are positioned within said housing between the individual bleed valves and the ends of said cylindrically shaped valve whereby the cylindrically shaped valve is normally centered within said housing.

3. A device as set forth in claim 2 in which the centrally located annular groove has slight communication with both of said outlet passages when the cylindrically shaped valve is centered within said housing.

4. A device as set forth in claim 1 in which said individual bleed valves are normally spring closed.

5. A device as set forth in claim 4 in which each of said individual bleed valves includes a transversely disposed disc, an integral stem extending longitudinally of said housing and beyond the end thereof to constitute manual actuating means, and end plugs for said housing through which the integral stems are permitted sliding movement, fluid sealing means positioned around said stems and within said end plugs permitting relative sliding movement without passage of fluid, and port means in said housing adjacent said individual bleed valve stems between the discs and the sealing means in the end plugs.

6. A control valve for fluids having a housing, said housing having an inlet passage and an outlet passage, a spool mounted for sliding movement within said housing, means on said spool for directing fluid from the inlet passage to the outlet passage, said means including the spool having a central passage and a radial passage joining the central passage to the outer surface of the spool, said central passage generally effecting a balanced pressure condition of fluids in said control valve, separate bleed means associated with each end of the housing, said central passage defining an enlarged chamber in the center thereof, spaced apart seats at each side of said chamber, and a valve member in said chamber having passage means therein, said passage means of the valve member being smaller than the central passage through the spool, whereby when either of the bleed means is opened the valve member slides to engagement with one of said spaced apart seats to completely open one seat to said enlarged chamber and close the other seat except for leakage through said passage means in said valve member to said enlarged chamber and thereby to create an out of balance pressure condition to cause the spool to quickly move to either one end or the other of the housing.

References Cited in the file of this patent

UNITED STATES PATENTS

| | | |
|---|---|---|
| 870,391 | Starrett | Nov. 5, 1907 |
| 1,791,613 | Clay | Feb. 10, 1931 |
| 2,121,936 | Thomas | June 28, 1938 |
| 2,132,811 | Tomkins | Oct. 11, 1938 |
| 2,237,038 | Moore | Apr. 1, 1941 |
| 2,261,827 | Brown | Nov. 4, 1941 |